United States Patent Office 3,798,221
Patented Mar. 19, 1974

3,798,221
COMPOUNDS OF PROPANOLOL AND BARBITURIC ACIDS FOR THE TREATMENT OF CARDIO-VASCULAR AILMENTS
Francis A. Langlumé, Paris, France, assignor to Etablissements Nativelle S.A.R.L., Paris, France
No Drawing. Continuation of abandoned application Ser. No. 697,303, Jan. 12, 1968. This application Aug. 2, 1971, Ser. No. 168,386
Claims priority, application France, Jan. 16, 1967, 91,205
Int. Cl. C07d 51/22
U.S. Cl. 260—258                      1 Claim

ABSTRACT OF THE DISCLOSURE

The invention has for its object new compounds having anti-arrhythmic, hypotensive and sedative properties particularly useful for the treatment of cardiovascular disorders, of the formula:

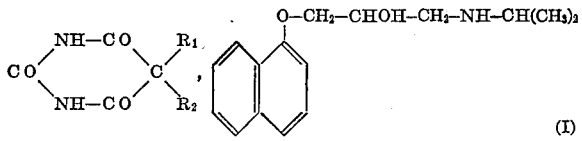

(I)

wherein $R_1$ and $R_2$, which may be the same or different, represent hydrogen, alkyl, cycloalkyl, aryl or aralkyl radicals, each of these radicals, if desired, carrying one or halogenated substituents. It also contemplates a process for the preparation of said compounds and a therapeutical composition containing same as active ingredient.

CROSS-REFERENCE TO RELATED APPLICATIONS

This application is a streamlined continuation application of my earlier co-pending application Ser. No. 697,303, filed Jan. 12, 1968 now abandoned.

The present invention has for its object new compounds possessing especially anti-arrhythmic, hypotensive and sedative properties particularly useful for the treatment of cardiovascular disorders, a process for their preparation and a therapeutical composition containing same.

The new compounds according to the invention have the general formula:

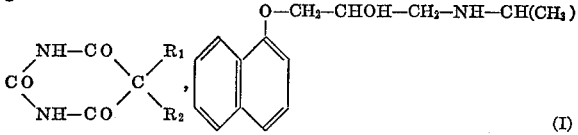

(I)

wherein $R_1$ and $R_2$, which may be the same or different, represent hydrogen or an alkyl, cycloalkyl, aryl or aralkyl radical, each of said radicals, if desired, carrying one or more halogenated substituents.

A particularly active compound in this series is propranolol phenylethylbarbiturate ($R_1=C_2H_5$; $R_2=C_6H_5$).

The process according to the invention for the preparation of compounds of Formula I is characterized in that one mole of a barbituric acid of formula:

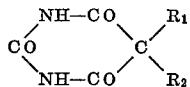

wherein $R_1$ and $R_2$ have the above defined meanings, is reacted with one mole of 1-isopropylamino-3-(1-naphthyloxy)-propan-2-ol or propranolol.

The reaction is carried out, for example, under reflux, in alcoholic, particularly ethanol, medium.

Results of toxicological and pharmacological tests carried out with propranolol phenylethylbarbiturate will now be given below for purely illustrative purpose, said compound being perfectly representative of the compounds of general Formula I, the portion of activity provided by the barbituric moiety of the formula being essentially due to the barbituric acid nucleus.

(1) TOXICOLOGICAL TESTS

Tests in mice, after administration by means of a probang of the material suspended in agar water, gave the $LD_{50}$ according to the method of Karber and Behrens.

$LD_{50}$:
  550 mg./kg. over 48 hours
  470 mg./kg. over one week.

(2) PHARMACOLOGICAL TESTS

Propranolol phenylethylbarbiturate was administered by the veinous and esophageal routes to dogs exhibiting experimental disorders of the cardiac rhythm.

The pentobarbital anesthetized animals were placed under artificial respiration and were submitted to thoracostomy. A few aconitine or delphinine crystals were placed, after incision of the pericardium, on the surface of the right auricle, close by the anastomosis of the venae cavae, and produced rapidly varying disorders of the rhythm which were detected and followed by the electrocardiographic method: sinusual tachycardia, supraventricular extrasystole, flutter, auricular fibrillation, and the like.

Propranolol phenylethylbarbiturate was administered upon stabilization of such disorders. An aqueous-alcoholic (95% alcohol: 40 ml., physiological saline solution: q.s. to 100 ml.) solution was perfused over 15 minutes into the saphenous vein at dosages which were varied between 0.5 to 10 mg./kg. of animal body weight. Propranolol phenylethylbarbiturate, suspended in 2 ‰ agar water, was given by means of a probang at dosages of 25 and 50 mg./kg., 5 minutes after the rhythm disorders were produced.

Administration of propranolol phenylethylbarbiturate made it possible to suppress the experimental disorders, with restoration of the normal sinusal rhythm. The onset, duration and intensity of the action of the material varied according to the dosage and the method of administration used. At too high dosages, toxicity phenomena appear and result in an interruption of the cardiac electric activity.

In human clinics the compounds according to the invention were found to possess anti-arrhythmic, hypotensive and sedative properties and were found particularly useful in the curative and preventive treatment of many cardiovascular disorders such, for example, as arrhythmia (extrasystole, auricular and ventricular tachycardia), angina pectoris, high blood pressure. Their perfect tolerance and controllability make them useful in treatments of long duration.

Thus, the invention contemplates also a therapeutical composition containing, as active ingredient, a compound of Formula I and a pharmaceutically acceptable vehicle.

The composition is advantageously administered by the oral route, while, however, the other routes of administration may also be used.

It is advantageously formulated in dosage unit form.

For oral administration, the composition may be formulated as capsules or tablets containing each 20–240 mg. of active ingredient and containing the usual excipients. The average administrable dosage may be, for example, 60 mg. of active ingredient, administered one to four times per 24 hours.

The nonlimiting example which follows is given to illustrate the invention.

EXAMPLE

Preparation of propranolol phenylethylbarbiturate 16 g. of propranolol and 14.33 g. of phenylethylbarbituric acid are refluxed during 30 minutes with 50 ml.

of ethyl alcohol. After cooling, the crude propranolol phenylethylbarbiturate (27 g.) is collected by suction filtering and is washed with alcohol, and is then purified by recrystallization from 60 ml. of ethyl alcohol.

This compound, of molecular weight 491, is in the form of white crystals which are insoluble in water and soluble in alcohol and chloroform. It may be assayed by titration of phenylethylbarbituric acid and of propanolol, and also by examination of its I.R. spectrum.

A method for the determination of phenylethylbarbituric acid and of propranolol is given below for indicative purposes.

A weight $p$ of accurately weighed compound, close to 0.250 mg., is intrduced into a small decantation funnel and is then dissolved in 10 ml. of chloroform. After addition of 10 ml. of N/10 sodium hydroxide and vigorous stirring:

(1) The chloroform phase is washed with 5 ml. of water, collected over dry potassium carbonate and is filtered above a tared capsule together with two 5 ml. portions of chloroform used for rinsing.

The combined chloroform solutions are evaporated to dryness, over the water-bath. After cooling, $p'$ is the weight of the resulting residue. This gives:

$$\text{Percent propranolol content} = \frac{p' \times 100}{p}$$

The theoretical content should be 52.7%.

(2) To the aqueous phase, to which has been added the water used to wash the chloroform extracts, are added 10 ml. of chloroform and 2 ml. of N hydrochloric acid. After stirring, the chloroform is washed with 5 ml. of distilled water and is collected in a tared capsule together with two 5 ml. portions of chloroform used to rinse the aqueous phase. The combined chloroform solutions are then evaporated to dryness, over the water-bath. $p''$ is the weight of the residue, after cooling. This gives:

$$\text{Percent phenylethylbarbituric acid content} = \frac{p'' \times 100}{p}$$

The theoretical content should be 47.2%.

The I.R. spectrum shows that the product, like all other compounds of the above-mentioned general formula, is not a mere mixture of phenylethylbarbituric acid and of propranolol, but a true chemically defined adduct.

Indeed, in the exemplified case and in contrast to what would be noted with a mere mixture, the I.R. spectrum of propranolol phenylethylbarbiturate exhibits an absorption maximum at $6.3\mu$ and has no peak at $5.67\mu$.

What is claimed is:

1. The compound 1-isopropylamino-3-(1-naphthyloxy) propan-2-ol-phenylethylbarbiturate.

References Cited
UNITED STATES PATENTS

| | | | |
|---|---|---|---|
| 1,879,389 | 9/1932 | Mietzsch | 260—258 |
| 2,969,363 | 1/1961 | Schlesinger et al. | 260—260 |

OTHER REFERENCES

Chemical Abstracts, vol. 63, 1965, 8130e relied on.

DONALD G. DAUS, Primary Examiner

A. M. T. TIGHE, Assistant Examiner

U.S. Cl. X.R.

424—254